(12) United States Patent
Seo et al.

(10) Patent No.: US 9,635,572 B2
(45) Date of Patent: Apr. 25, 2017

(54) METHOD FOR COORDINATING INTERFERENCE IN AN UPLINK INTERFERENCE CHANNEL FOR A TERMINAL IN A WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hanbyul Seo, Anyang-si (KR); Dongku Kim, Seoul (KR); Sungyoon Cho, Seoul (KR); Byounghoon Kim, Anyang-si (KR); Kaibin Huang, Hong Kong (CN)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 164 days.

(21) Appl. No.: 14/347,518

(22) PCT Filed: Sep. 26, 2012

(86) PCT No.: PCT/KR2012/007761
§ 371 (c)(1),
(2) Date: Mar. 26, 2014

(87) PCT Pub. No.: WO2013/048115
PCT Pub. Date: Apr. 4, 2013

(65) Prior Publication Data
US 2014/0226520 A1     Aug. 14, 2014

Related U.S. Application Data

(60) Provisional application No. 61/539,442, filed on Sep. 26, 2011.

(51) Int. Cl.
*H04W 24/08* (2009.01)
*H04B 7/06* (2006.01)
(Continued)

(52) U.S. Cl.
CPC ........... *H04W 24/08* (2013.01); *H04B 7/024* (2013.01); *H04B 7/0417* (2013.01);
(Continued)

(58) Field of Classification Search
CPC ... H04W 24/08; H04B 7/0665; H04B 7/0417; H04B 7/024; H04B 7/0617; H04B 7/0619; H04B 7/0434; H04B 7/0452
See application file for complete search history.

(56) References Cited

U.S. PATENT DOCUMENTS

2008/0293371 A1\* 11/2008 Kishigami ........... H04B 7/0452
455/278.1
2010/0232534 A1\* 9/2010 Lee ........................ H04B 7/043
375/267
(Continued)

FOREIGN PATENT DOCUMENTS

KR   10-2010-0086407 A   7/2010
KR   10-2011-0035555 A   4/2011
(Continued)

OTHER PUBLICATIONS

Namyoon Lee, Wonjae Shin and Bruno Clerckx, "Interference Alignment with Limited Feedback on Two-cell Interfering Two-User MIMO-MAC," CoRR (Computing Research Repository), vol. abs/1010.0933, [Online]. Available: http://arxiv.org/abs/1010.0933, Oct. 5, 2010.\*
(Continued)

*Primary Examiner* — Kwang B Yao
*Assistant Examiner* — Moo Ryong Jeong
(74) *Attorney, Agent, or Firm* — Birch, Stewart, Kolasch & Birch, LLP

(57) ABSTRACT

Provided are an interference mitigation method and a base station device in a wireless communication system. The interference mitigation method to be performed by a base station comprises a step in which a serving base station measures interference from a terminal that belongs to a neighboring cell; a step of determining a beamforming vector of the neighboring cell on the basis of the measured interference; a step of transmitting the beamforming vector of the neighboring cell to a base station of the neighboring cell; and a step of feeding back, to a terminal that belongs to a serving cell, the beamforming vector of the serving base station determined on the basis of the beamforming vector of the neighboring cell.

12 Claims, 8 Drawing Sheets

(51) Int. Cl.
| | | |
|---|---|---|
| H04B 7/04 | (2006.01) | |
| H04B 7/02 | (2006.01) | |
| H04B 7/024 | (2017.01) | |
| H04B 7/0417 | (2017.01) | |
| H04B 7/0452 | (2017.01) | |

(52) U.S. Cl.
CPC ......... *H04B 7/0434* (2013.01); *H04B 7/0617* (2013.01); *H04B 7/0619* (2013.01); *H04B 7/0665* (2013.01); *H04B 7/0452* (2013.01)

(56) References Cited

U.S. PATENT DOCUMENTS

| | | | |
|---|---|---|---|
| 2011/0064035 A1* | 3/2011 | Guerreiro | H04B 1/1027 370/329 |
| 2011/0177834 A1 | 7/2011 | Shin et al. | |
| 2011/0222615 A1* | 9/2011 | Kuo | H04B 7/0404 375/260 |
| 2011/0319092 A1 | 12/2011 | Kim et al. | |
| 2012/0163433 A1* | 6/2012 | Koike-Akino | H04W 28/048 375/220 |

FOREIGN PATENT DOCUMENTS

| | | |
|---|---|---|
| KR | 10-2011-0080241 A | 7/2011 |
| KR | 10-2011-0084818 A | 7/2011 |
| WO | WO 2011/096747 A2 | 8/2011 |

OTHER PUBLICATIONS

Jung Hoon Lee and Wan Choi, "Opportunistic Interference Aligned User Selection in Multiuser MIMO Interference Channels," IEEE Globecom 2010, Dec. 6-10, 2010.*

Suh et al., "Interference Alignment for Cellular Networks", 2008, 46th annual allerton conference on communication, control, and computing, Sep. 23-26, 2008, pp. 1037-1044.

* cited by examiner

METHOD FOR COORDINATING INTERFERENCE IN AN UPLINK INTERFERENCE CHANNEL FOR A TERMINAL IN A WIRELESS COMMUNICATION SYSTEM

CROSS REFERENCE TO RELATED APPLICATIONS

This non-provisional application is a National Stage entry under U.S.C. §371 of International Application No. PCT/KR2012/007761 filed on Sep. 26, 2012, which claims the benefit of U.S. Provisional Application No. 61/539,442 filed on Sep. 26, 2011. The entire contents of all of the above applications are hereby incorporated by reference.

TECHNICAL FIELD

The present invention relates to a method for coordinating interference in an uplink interference channel for a user equipment in a wireless communication system.

BACKGROUND ART

A Multi-Input Multi-Output (MIMO) scheme means that a base station and a user equipment simultaneously transmit several data streams (or layers) spatially by using two or more transmitting/receiving antennas so as to increase system capacity. The MIMO scheme includes a transmit diversity scheme, a spatial multiplexing scheme, or a beamforming scheme.

The transmit diversity scheme is advantageous in that same data information is transmitted through several transmitting antennas to implement data transmission of high reliability without channel feedback from a receiver. The beamforming scheme is used to increase a received signal to interference plus noise ratio (SINR) of a receiver by multiplying several transmitting antennas by proper weight values. Generally, since uplink/downlink channels are independent in a frequency division duplexing (FDD) system, channel information of high reliability is required to obtain proper beamforming gain. In this case, the channel information is separately fed back from the receiver.

Meanwhile, the spatial multiplexing scheme may be divided into a single user spatial multiplexing scheme and a multi-user spatial multiplexing scheme. The single user spatial multiplexing scheme is referred to as a spatial multiplexing (SM) scheme or a single user MIMO (SU-MIMO) scheme. In the single user spatial multiplexing scheme, a plurality of antenna resources of a base station are allocated to a single user (user equipment), and capacity of a MIMO channel is increased in proportion to the number of antennas. Meanwhile, the multi-user spatial multiplexing scheme is referred to as a spatial divisional multiple access (SDMA) scheme or a multi-user MIMO (MU-MIMO) scheme. In the multi-user spatial multiplexing scheme, a plurality of antenna resources of a base station or radio spatial resources are distributed to a plurality of users (user equipments).

Examples of the MIMO scheme include a Single Code-Word (SCW) scheme and a Multiple Code Word (MCW) scheme, wherein the SCW scheme is intended to transmit N number of data streams (or layers) at the same time by using single channel encoding block, and the MCW scheme is intended to transmit N number of data streams by using M (M≤N) number of channel encoding blocks. In this case, each channel encoding block generates independent codewords, each of which is designed to enable independent error detection.

Generally, in a communication system, a user equipment existing in the communication system may receive an interference signal from neighboring base stations that are adjacent to a service base station.

In particular, the user equipment located at the cell edge may be more affected by interference of base stations of a neighboring cell than the user equipments located at the cell interior. This interference signal is one of important factors that reduce transmission efficiency of a data rate of a transmitting signal.

Recently, in a multi-user interference channel environment where a plurality of base stations transmit data a plurality of user equipments while interfering with one another, a method for improving system capacity has actively studied.

Generally, in an actual environment, inter user interference between user equipments existing within the service base station as well as inter-cell interference generated by neighboring base stations occurs.

Accordingly, considering inter cell interference and inter user interference, studies on the interference control technology that may use restricted radio resources within the maximum range will be required.

DISCLOSURE

Technical Problem

An object of the present invention devised to solve the conventional problem is to provide a method and apparatus for enabling a user equipment to perform communication with a base station.

Another object of the present invention is to provide a method and apparatus for enabling a base station to perform communication with a user equipment.

Still another object of the present invention is to provide a user equipment for performing communication with a base station.

Further still another object of the present invention is to provide a base station for performing communication with a machine to machine (M2M) device.

Technical Solution

In one aspect of the present invention, a method for reducing interference of a base station in a wireless communication system comprises measuring interference from a user equipment that belongs to a neighboring cell at a serving base station; determining a beamforming vector of the neighboring cell and a beamforming vector of the serving base station based on the measured interference; transmitting the beamforming vector of the neighboring cell to a base station of the neighboring cell; and feeding the beamforming vector of the serving base station back to a user equipment that belongs to a serving cell.

For example, the beamforming vector of the neighboring cell is transmitted to the base station of the neighboring cell through a backhaul link.

For example, the beamforming vector that belongs to the user equipment of the serving cell is determined based on an eigenvector based on the smallest eigenvalue of an interference channel to maximize a transmission power of the user equipment that belongs to the serving cell, and wherein determining the beamforming vector of the neighboring cell is iteratively performed until values of the eigenvector and the beamforming vector of the user equipment that belongs to the serving cell are converged.

For example, the method further comprises selecting a user equipment having maximum channel gain in accordance with a maximum signal to noise rate (SNR) scheduler, when there are a plurality of user equipments that belong to the serving cell, and scheduling the interference channel by using an interference channel of the selected user equipment.

For example, the method further comprises selecting a user equipment having maximum channel gain in accordance with a maximum signal to noise rate (SNR) scheduler, when there are a plurality of user equipments that belong to the neighboring cell, and scheduling the interference channel by using an interference channel of the selected user equipment.

For example, a beamforming vector of the selected user equipment is calculated by the neighboring cell and then received.

For example, the beamforming vector of the neighboring cell is iteratively calculated and received until a value of the beamforming vector of the neighboring cell is converged.

For example, the beamforming vector of the neighboring cell is determined in accordance with measured time of interference from the user equipment that belongs to the neighboring cell, frequency, resource and feedback bit.

In another aspect of the present invention, a base station for reducing interference in a wireless communication system comprises a receiver; a transmitter; and a processor configured to control the receiver and the transmitter, wherein the processor enables a serving base station to measure interference from a user equipment that belongs to a neighboring cell, determines a beamforming vector of the neighboring cell and a beamforming vector of the serving base station based on the measured interference, controls the transmitter to transmit the beamforming vector of the neighboring cell to a base station of the neighboring cell and feeds the beamforming vector of the serving base station back to a user equipment that belongs to a serving cell.

For example, the beamforming vector of the neighboring cell is transmitted to the base station of the neighboring cell through a backhaul link.

For example, the beamforming vector that belongs to the user equipment of the serving cell is determined based on an eigenvector based on the smallest eigenvalue of an interference channel to maximize a transmission power of the user equipment that belongs to the serving cell, and wherein the beamforming vector of the neighboring cell is iteratively determined until values of the eigenvector and the beamforming vector of the user equipment that belongs to the serving cell are converged.

For example, when there are a plurality of user equipments that belong to the serving cell, a user equipment having maximum channel gain is selected in accordance with a maximum signal to noise rate (SNR) scheduler, and the interference channel is scheduled by using an interference channel of the selected user equipment.

For example, when there are plurality of user equipments that belong to the neighboring cell, a user equipment having maximum channel gain is selected in accordance with a maximum signal to noise rate (SNR) scheduler, and the interference channel is scheduled by using an interference channel of the selected user equipment.

For example, a beamforming vector of the selected user equipment is calculated by the neighboring cell and then received.

For example, the beamforming vector of the neighboring cell is iteratively calculated and received until a value of the beamforming vector of the neighboring cell is converged.

For example, the beamforming vector of the neighboring cell is determined in accordance with measured time of interference from the user equipment that belongs to the neighboring cell, frequency, resource and feedback bit.

Advantageous Effects

According to various embodiments of the present invention, a reference vector used to coordinate all other cell interferences (OCI) is designed. A suggested direction of the reference vector minimizes remaining OCI in accordance with a limited feedback channel.

Also, as each precoder and each receiver are updated gradually, a design method of the precoder and the receiver is enhanced by a received signal power in an interference alignment (IA) structure.

Also, as a method for exchanging transmission beamformers between base stations to design an IA transceiver that reduces burden of channel state information (CSI) exchange, multi-user diversity may be increased using an IA transceiver combined with a scheduler in a multi-cell environment.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), an advanced mobile station (AMS) and a machine to machine (M2M) device. Also, it is assumed that a base station refers to a random node of a network terminal, such as Node B, eNode B, an advanced base station (ABS), and access point (AP), which performs communication with the user equipment. In this specification, although the present invention will be made based on the IEEE 802.16e/m, the present invention may be applied to other communication systems such as 3GPP LTE and LTE-A system.

Figure 1:
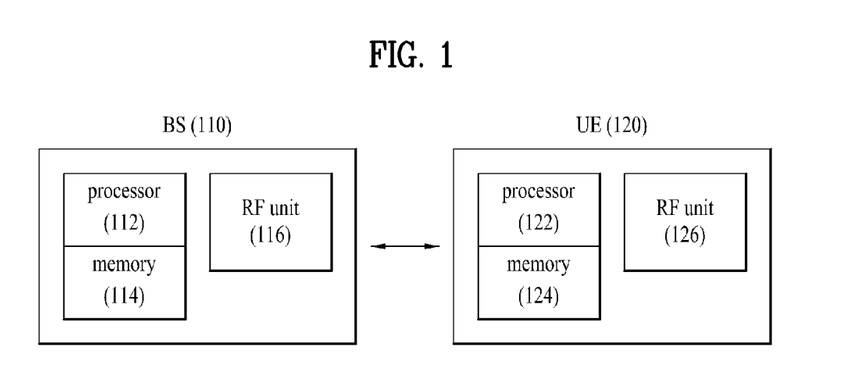
FIG. 1 is a brief diagram illustrating a configuration of an M2M device and a base station according to one embodiment of the present invention.

FIG. 1 is a brief diagram illustrating a configuration of an M2M device and a base station according to one embodiment of the present invention.

Referring to FIG. 1, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The processor 112 may control the radio frequency unit 116 to transmit a plurality of kinds of configuration information for periodic report of CSI to the user equipment. Alternatively, the processor 112 may control the radio frequency unit 116 to receive each CSI on a plurality of CSI report sets based on the configuration information from the user equipment through a physical uplink control channel (PUCCH). The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The processor 122 may control the radio frequency unit 126 to receive a plurality of kinds of configuration information for periodic report of CSI from the base station. Alternatively, the processor 122 may control the radio frequency unit 126 to transmit each CSI on a plurality of CSI report sets based on the configuration information to the base station through a physical uplink control channel (PUCCH). The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The processor 112 or 122 may be referred to as a controller, a microcontroller, a microprocessor, and a microcomputer. Meanwhile, the processor 112 or 122 may be implemented by hardware, firmware, software, or their combination. If the embodiments according to the present invention are implemented by hardware, application specific integrated circuits (ASICs), digital signal processors (DSPs), digital signal processing devices (DSPDs), programmable logic devices (PLDs), field programmable gate arrays (FPGAs), which are configured to perform the present invention, may be provided in the processor 120 or 170.

Meanwhile, if the embodiments according to the present invention are implemented by firmware or software, firmware or software may be configured to include a module, a procedure, or a function, which performs functions or operations of the present invention. The firmware or software configured to perform the present invention may be provided in the processor 112 or 122, or may be stored in the memory 114 or 124 and then may be driven by the processor 112 or 122.

Interference alignment (IA) is the technology suggested to maximize degrees-of-freedom (DoF) in an interference channel and minimize interference in a wireless network. By using this technology, each receiver forces received interference to be located at a specific subspace, and a transmitter coordinates a transmitted signal to allow interference free data communication at a signal space which remains. Recently, the IA technology is referred to as subspace IA (S-IA) and has been suggested for a cellular network. This IA technology is intended to acquire the number of degrees-of-freedom (DoF), which is approximate to the number of antennas, on each base station by providing perfect channel state information (CSI). However, a CSI error exists in an operation based on limited feedback, and as a result, residual inter-cell interference (ICI) limits system throughput.

In other words, in the related art as described above, in a method for nulling interference, if nulling is performed, it is advantageous in that interference is nulled, whereas a problem occurs in that a signal power is reduced. Accordingly, in accordance with a zero-force scheme, a scheme for reducing noise interference, although not fully removed, and enhancing a signal power will be required.

Recently, a multi-cell cooperative communication system that reduces an influence of OCI through cooperation of a plurality of base stations has received much attention. According to this system, base stations connected through a backbone network of high speed may enhance a sum transmission rate of the system by commonly configuring transmission beamforming and nulling or reducing OCI. In particular, efficiency of this system is more enhanced as the number of antennas of the base station and the user equipment is increased.

Accordingly, in the present invention, the downlink S-IA may be implemented by an in-cell feedback mechanism, whereas the uplink S-IA requires burden of a backhaul as well as a feedback bandwidth which is a key challenge for the implementation. This task considers a multiple-input-multiple-output (MIMO) uplink system of two cells, and suggests an advanced IA algorithm that reduces residual ICI based on the limited feedback.

The suggested algorithm is based on the IA technology. ICI direction protected by each base station is coordinated by a reference vector which is randomly selected. Zeroforcing based directional IA (ZF based D-IA) which is a main idea suggested in the present invention, is intended to optimize an IA reference vector for minimizing a size of residual interference power caused by limited CSI feedback in each base station.

Second, the present invention suggests a modified D-IA algorithm referred to as an iterative D-IA algorithm. This algorithm uses an interference channel as well as gain of a received channel. Accordingly, according to the iterative D-IA algorithm, sum throughput in SNR of a lower area and a middle area is more increased than that of a ZF based D-IA algorithm. Throughput of the iterative D-IA algorithm is quantified by analysis of throughput loss caused by reduction of the required number of feedback bits that reflect the S-IA algorithm and inaccurate CSI. A simulation result approves that the D-IA algorithm provides remarkable throughput gain as compared with the S-IA algorithm.

Figure 2:
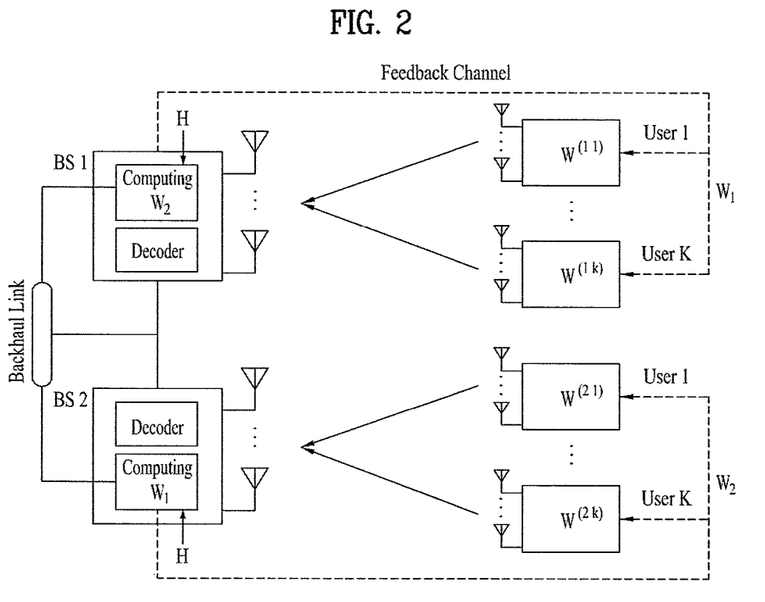
FIG. 2 is a diagram illustrating a MIMO uplink system of two cells according to one embodiment of the present invention.

FIG. 2 is a diagram illustrating a MIMO uplink system of two cells according to one embodiment of the present invention.

Referring to FIG. 2, in the present invention, it is assumed that two base stations and two user equipments, which respectively belong to the base stations, exist. In FIG. 2, a first base station, which includes a first user equipment (User 1) and a second user equipment (User 2), and a second base station, which includes a first user equipment (User 1) and a second user equipment (User 2) are provided. In a communication environment of FIG. 2, if the first user equipment and the second user equipment transmit an uplink signal to each base station, the first user equipment transmits the uplink signal in a direction of axis 'x', and the second user equipment transmits the uplink signal to the first base station in a direction of axis 'y' in accordance with beams in an orthogonal direction to reduce interference between the uplink signals transmitted from each user equipment. Accordingly, signal transmission may be performed between the uplink signals of the first user equipment and the second user equipment, which belong to the first base station, without interference in an orthogonal direction. However, in FIG. 2, a problem occurs in that the uplink signals of the first and second user equipments that belong to the second base station may cause interference on the uplink signals of the first and second user equipments that belong to the first base station. Accordingly, a beam direction of the uplink signals of the first and second user equipments that belong to the second base station, which act as interference on the uplink signals of the first and second user equipments that belong to the first base station, may be changed to a direction of axis 'z', so as to allow x directional signal transmission of the uplink of the first user equipment that belongs to the first base station to be orthogonal to y directional signal transmission of the uplink of the second user equipment that belongs to the first base station, whereby interference may be reduced. In other words, the interference signal may be set to the first and second user equipments that belong to the first base station, in a direction of axis 'z'. Accordingly, even though four uplink signals of the user equipment exist in FIG. 2, all the interference signals may be set in a direction of axis 'z' within a three-dimension, whereby interference may be removed. Hereinafter, the terminology 'user equipment' may be used to refer to 'user'.

According to the related art, the base station, which is a transmission device, changes a beamforming vector of a downlink signal. However, according to the present invention, it is advantageous in that a transmission device which is not limited to the base station may change the uplink signal in accordance with scheduling, and may transmit the uplink signal in a preferred direction measured on a specific channel.

For example, the present invention assumes the MIMO uplink system of the two cells, each of which includes K number of users, each of which transmits single data to a corresponding base station. The base station provides M antennas that support spatial-division multiple access according to related user. The M antennas are used for each user for IA. The signal received from the ith base station is expressed by the following Equation 1.

$$y_i = \sum_{k=1}^{K} H_i^{[ik]} w^{[ik]} s^{[ik]} + \sum_{m=1}^{K} H_i^{[jm]} w^{[jm]} s^{[jm]} + n_i \quad \text{[Equation 1]}$$

Referring to Equation 1, $y_i$ is the signal received from the ith base station, $s^{[ik]}$ is a data symbol transmitted from the kth user located at the ith cell, and CN(0,P) depends on variation. In this case, M×1 vector $w^{[ik]}$ is a corresponding beamformer, and $n_i$ is a sample of additive Gaussian noise process having unit variation. A fading channel between the kth user and the ith base station of the jth cell is expressed by M×M random vector $H_i^{[ik]}$ that includes CN(0,1).

The beamformer applied to the users is designed using the IA algorithm by Equation 2 based on limitation of M=K+1. $v_i$ is defined as a reference vector for coordinating the transmission beamformer at the jth cell. Although $v_i$ is randomly selected, it is important that $v_i$ is defined to be optimized in accordance with the current task. For convenience, IA algorithm having random $v_i$ is referred to as IA with random reference (R-IA). In this case, in a given $v_i$, i≠j, the beamformer $w^{[jk]}$ is designed in the same direction as that of a reference vector of a neighboring cell, and is designed as a linear receiver $r^{[ik]\dagger}U_i^\dagger$ continuously connected from the ith base station. In this case, $U_i^\dagger$ satisfies $U_i^\dagger \in C^{K \times M}$, and $r^{[ik]\dagger}$ satisfies a condition of $r^{[ik]\dagger} \in C^{1 \times K}$. Also, the beamformer $w^{[jk]}$ is designed to remove ICI, and remove intra cell interference at each ith cell. In particular, $U_i$ is selected based on orthogonality for nullspace of $v_i^\dagger$ and $r^{[ik]\dagger}$ is set to the kth row vector $\bar{H}_i^\dagger(\bar{H}_i\bar{H}_i^\dagger)^{-1}$ and its size is normalized to 1. In this case, $\bar{H}_i$ is $\bar{H}_i = \{U_i^\dagger H_i^{[iK]} w^{[i1]}; \ldots ; U_i^\dagger H_i^{[iK]} w^{[iK]}\}$. At this time, it is assumed that the base stations may perfectly estimate uplink channels. The ith base station uses the estimated CSI to calculate $W_j = \{w^{j1}, \ldots, w^{jK}\}$, and transmits $W_j$ to the jth base station through a backhaul link. As a result, the jth base station feeds $\hat{W}_j = \{\hat{w}^{j1}, \ldots, \hat{w}^{jK}\}$, which is a quantized beamformer, back to its corresponding user through a limited transmission rate feedback channel described with reference to FIG. 1.

$$w^{[ik]} = \frac{(H_i^{[ik]})^{-1} v_i}{\|(H_i^{[ik]})^{-1} v_i\|}, 1 \leq k \leq K \quad \text{[Equation 2]}$$

$$C^{[ik]} = \log_2(1 + P \cdot |r^{[ik]\dagger} U_i^\dagger H_i^{[ik]} w^{[ik]}|^2) \quad \text{[Equation 3]}$$

However, residual ICI still exists in case of limited feedback, which will be described later. Each base station notifies the corresponding user of the normalized beamformer $\hat{w}^{[ik]}$ through B-bit feedback channel by using random vector quantization (RVQ).

Equation 4 represents the normalized beamformer $\hat{w}^{[ik]}$.

$$\hat{w}^{[ik]} = (\cos \theta_k) w^{[ik]} + (\sin \theta_k) \bar{w}^{[ik]} \quad \text{[Equation 4]}$$

In this case, $\theta_k$ is an angle between $\hat{w}^{[ik]}$ and $w^{[ik]}$, and $\overline{w}^{[ik]}$ is an error space having a value of norm of 1. Also, $$E[\sin^2\theta_k] \leq 2^{-\frac{B}{M-1}}.$$

A user transmission rate of the Kth user at the ith cell is expressed by the following Equation 5.

$$\hat{C}^{[ik]} = \log_2\left(\frac{1+P\cdot|\hat{r}^{[ik]\dagger}U_i^\dagger H_i^{[ik]}\hat{w}^{[ik]}|^2}{I_i+1}\right) \quad \text{[Equation 5]}$$

In this case, $\hat{r}^{[ik]\dagger}$ is the Kth row vector $\overline{H}_i^\dagger(\overline{H}_i\overline{H}_i^\dagger)^{-1}$, $\overline{H}_{i=\{}U_i^\dagger H_i^{[i1]\dagger}; \ldots; U_i^\dagger H_i^{[iK]\dagger}w^{[iK]}\}$ designed, and residual interference is $$I_i = P\cdot\sum_{k=1}^{K}|\hat{r}^{[ik]\dagger}U_i^\dagger H_i^{[ik]}\hat{w}^{[ik]}|^2.$$

The present invention relates to a directional interference alignment (D-IA) method, and more particularly, is intended to coordinate interference caused by uplink MIMO interference channels.

In other words, the present invention is intended to consider interference alignment in a multiple-input-multiple-output (MIMO) uplink system having finite-rate feedback in two cells.

First of all, the present invention is intended to optimize a reference vector of interference.

The IA algorithm coordinates inter-cell interference (ICI) between all the neighboring cells in a reference vector which is randomly selected, whereas the present invention is intended to optimize a reference vector that minimizes residual interference of upper-bound at neighboring base stations.

The suggested reference vector is determined by an eigenvector corresponding to the greatest eigenvalue of an aggregate channel. The aggregate channel is defined by sum of Wishart matrix of the interference channel.

Second, the present invention is intended to suggest an iterative IA method. The iterative IA method determines a direction of a filter, which performs transmission and reception, to maximize the received signal as well as minimize ICI. Moreover, implementation gain of each of the IA method of the related art and the suggested IA method is analyzed from given feedback bits and the number of antennas. The simulation result shows that the suggested IA obtains remarkable throughput gain on the strongest interference channel.

In particular, the present invention suggests three algorithm schemes as follows.

Examples of the three algorithm schemes include a zero force based directional IA (ZF-based D-IA) algorithm, an iterative directional-IA algorithm, and a maximum SNR scheduling with D-IA algorithm.

1. ZF-Based Directional-IA

In the aforementioned scheme, cellular IA is focused on all the interferences in each base station on a specific subspace, and completely removes ICI as complete estimation of a feedback channel. However, in this limited feedback channel, the power of residual interference depends on a direction of a subspace for the IA. The suggested algorithm provides an optimized reference vector for IA design. The optimized reference vector is minimized to an approximate value on residual interference power in each base station.

From difference between $C^{[ik]}$ and $\hat{C}^{[ik]}$, transmission loss of each user in the ith base station from difference between $C^{[ik]}$ and $\hat{C}^{[ik]}$ is expressed by the following Equation 6.

$$C^{[ik]}-\hat{C}^{[ik]}=\Delta C_i=E[\log_2(1+I_i)]\leq\log_2(1+E[I_i]) \quad \text{[Equation 6]}$$

In this case, the upper-bound value depends on Jensen's inequality. Since $\Delta C_i$ is increased monotonically by residual interference, the present invention suggests D-IA that determines the reference vector to minimize the residual interference.

In a given channel aggregation H, residual interference at the ith base station is specified by transmission power, channel gain, and feedback bits given by Equation 7.

$$E_w[I_i] = E_w\left[P\sum_{k=1}^{K}|\hat{r}^{[ik]\dagger}U^{[ik]\dagger}H_i^{[jk]}(\sin\theta_k)\overline{w}^{[jk]}|^2 \stackrel{(a)}{\leq}\right.$$

$$P\cdot\sum_{k=1}^{K}\|U^{[ik]\dagger}H_i^{[jk]}\|^2\cdot E[\|\sin\theta_k\|^2] \leq$$

$$P\cdot\sum_{k=1}^{K}\|U^{[ik]\dagger}H_i^{[jk]}\|^2\cdot 2^{-\frac{B}{M-1}}$$

In this case, (a) depends on $\|a^\dagger b\|\leq\|a\|\|b\|$ and $a \in C^{m\times l}$. In this case, system parameters P, B, M are given, and the residual interference power is based on design of $U_i$. Since $U_i$ is orthogonal to $v_i$, design of minimized $U_i$ based on the Equation 6 corresponds to a case where a minimized $v_i^\dagger$ based on the Equation 7 is discovered.

$$\overline{H}_i\overline{H}_i^{a\dagger} = \sum_{k=1}^{K}H_i^{[jk]}H_i^{[jk]\dagger} = V_i\sum_i V_i^\dagger,$$

$V_i \in C^{M\times M}$ is a single matrix, and $\Sigma=\text{diag}\{\lambda_1, \lambda_2, \ldots, \lambda_M\}$, $\lambda_1\geq\lambda_2\geq \ldots \geq\lambda_M$. The Equation 7 may express $f(U_i|H)$ as follows.

$$f(U_i|H)) = c\cdot\sum_{k=1}^{K}\|U_i^\dagger H_i^{[jk]}\|^2 = \quad \text{[Equation 8]}$$

$$c\cdot tr\left(U_i^\dagger\sum_{k=1}^{K}H_i^{[jk]}H_i^{[jk]\dagger}U_i\right) = c\cdot\|U_iH_i^a\|^2$$

At this time, tr(A) is a trace of A, and $c=P\cdot 2B/M-1$. Optimized $U^*_i$ that minimizes $f(U_i|H)$ may be discovered in accordance with Equation 9 by using orthogonal attributes of $U_i$ to $v_i$.

$$\min_{U_i^*}\|U_iH_i^a\|^2 = \|H_i^a\|^2 - \max_{v_i^*}\|U_iH_i^a\|^2 \quad \text{[Equation 9]}$$

From Rayleigh-Ritz theory, $v^*_i$ is determined by eigenvector $V_i(:,1)$ corresponding to $\lambda_1$. Also, $U^*_i$ is determined by eigenvector $V_i(:,2:M)$ corresponding to $\{\lambda_2, \ldots, \lambda_M\}$.

ZF-based Directional-IA suggested in the present invention is the first method. The ZF-based Directional-IA is the method for minimizing residual interference for designing the optimized reference vector.

In other words, to minimize upper-bound of transmission loss at the ith base station, $v^*_i$ which is the optimized reference vector is determined by an eigenvector corresponding to $H_i^a H_i^{a\dagger}$ which is the maximum eigenvalue. In this case, the sum channel $H_i^a$ satisfies $H_i^a \in C^{M \times K}$ constituting $H_i^a = [H_i^{[j1]} \ldots H_i^{[jK]}]$.

First of all, the ith base station calculates $U_i$. At this time, the ith base station estimates the interference channel which is $H_i^a = [H_i^{[j1]} \ldots H_i^{[jK]}]$, and calculates $U_i$ and $v^*_i$ by using the Equation 9. In other words, the ith base station obtains the reference vectors $v^*_i$ and $U_i$ by measuring the interference channel of the user equipment that performs uplink transmission to the jth base station.

Afterwards, the ith base station updates $W_j$ from $v^*_i$ and $w^{[ik]}$ determined using the Equation 2. In other words, the ith base station determines beamforming to the jth base station in accordance with the beamforming vector of the user equipment.

Next, the beamformers between the base stations is exchanged with each other. The ith base station forwards $W_j$ to the jth base station through a backhaul link.

The ith base station feeds the beamformer back to the corresponding user equipment and transmits data to the corresponding user equipment. The ith base station feeds $w^{[ik]}$ back to the kth user located at the ith cell through a feedback channel. Then, the kth user transmits the received symbol $s^{[ik]}$ to the ith base station by using the beamforming vector $w^{[ik]}$.

The D-IA to which the present invention is applied is compared with the R-IA. In the D-IA and the R-IA, $B_R$ and $B_D$ are the number of feedback bits based on each user. In the Equation 7 and the Equation 8, transmission rate loss of the kth user at the ith cell depends on the upper-bound.

$$\Delta \hat{C}_i^R = \log_2(1 + E[\hat{I}_i]) \leq \quad \text{[Equation 10]}$$

$$\log_2\left(1 + P \cdot E[\|H_i^a\|^2 - \|v_i^\dagger H_i^a\|^2] \cdot 2^{-\frac{B_R}{M-1}}\right) =$$

$$\log_2\left(1 + P \cdot (KM^2 - E[\lambda_R]) \cdot 2^{-\frac{B_R}{M-1}}\right)$$

In this case, $E[\|H_i^a\|^2] = E[\Sigma_{k=1}^M \lambda_R] = KM^2$ and $\|v_i^\dagger H_i^a\|^2 = \lambda_R$ represent channel gain of $H_i^a H_i^{a\dagger}$ which is randomly selected.

Similarly to the Equation 10, the upper-bound of the transmission rate loss in D-IA is given as expressed by the following Equation 11.

$$\Delta \hat{C}_i^D \leq \log_2\left(1 + P \cdot E[\|H_i^a\|^2 - \|v_i^{*\dagger} H_i^a\|^2] \cdot 2^{-\frac{B_D}{M-1}}\right) = \quad \text{[Equation 11]}$$

$$\log_2\left(1 + P \cdot (KM^2 - E[\lambda_1]) \cdot 2^{-\frac{B_D}{M-1}}\right)$$

For the amount of implementation gain of the D-IA at the given feedback bits, the transmission rate loss between user transmission rates in the D-IA and the R-IA is expressed by the following Equation 12.

$$\Delta C_i^d = E[\hat{C}_D^{[ik]}] - E[\hat{C}_R^{[ik]}] \approx \Delta \overline{C}_i^R - \Delta \overline{C}_i^D \approx \quad \text{[Equation 12]}$$

$$\log_2\left(\frac{1 + P \cdot (KM^2 - E[\lambda_R]) \cdot 2^{-\frac{B_R}{M-1}}}{1 + P \cdot (KM^2 - E[\lambda_1]) \cdot 2^{-\frac{B_D}{M-1}}}\right)$$

Referring to the Equation 12, the approximate value depends on the upper-bound of the transmission rate loss in the Equation 11 and the Equation 12 that generates more exact result. In case of the same feedback bit such as $B_R = B_D = B$, implementation gain of the D-IA for each user is dependent on the number of users and antennas, and scale $$o\left(\log_2\left(\frac{KM^2 - E[\lambda_R]}{KM^2 - E[\lambda_1]}\right)\right).$$

In the D-IA and the R-IA, the difference of feedback bits intended to be obtained equally for each user transmission rate of $\Delta C_i^d = 0$ is expressed by the following Equation 13.

$$\Delta B = B_R - B_D \approx (M-1) \cdot \log_2\left(\frac{KM^2 - E[\lambda_R]}{KM^2 - E[\lambda_1]}\right) \quad \text{[Equation 13]}$$

M=3, K=2, M=4, and K example=3 scenarios are considered. In the Equation 13, a constant $\Delta B = 1.5$ may be obtained from a random feedback bit. In other words, the D-IA provides the same throughput as that of the R-IA of (B+1.5) bit codebook on average by using B bit codebook.

Figure 3:
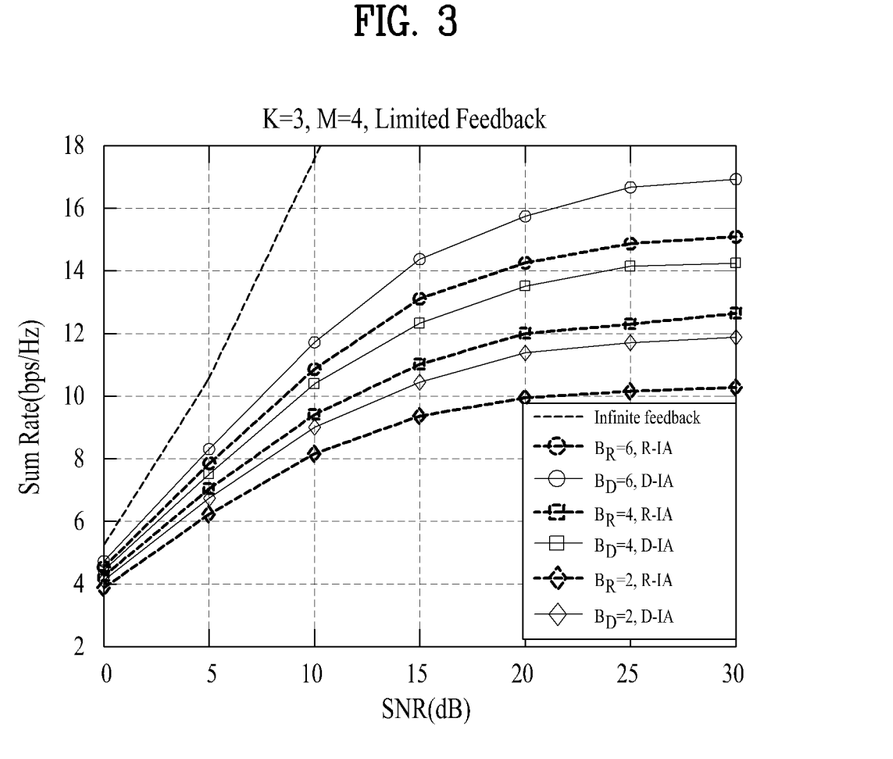
FIG. 3 is a diagram illustrating a sum transmission rate in D-IA and R-IA schemes in case of M=4 and K=3 according to one embodiment of the present invention.

FIG. 3 is a diagram illustrating a sum transmission rate in D-IA and R-IA schemes in case of M=4 and K=3 according to one embodiment of the present invention.

Referring to FIG. 3, a numerical result evaluates implementation of sum transmission rate of the D-IA as compared with the R-IA at different values of the feedback bits. FIG. 3 illustrates a numerical result based on M=4 and K=3 in case of each of various quantization levels B=2, 4 and 6. If bits used in the D-IA and the R-IA are 2, 4 and 6, the number K of users is 3, and the number of antennas M is 4, it is noted that a sum transmission rate based on SNR in the D-IA is remarkably higher than that of the R-IA in the same SNR and the same bit.

A sum transmission rate in a limited feedback approximates to a sum transmission rate based on infinite transmission rate feedback as B becomes greater. However, since the sum transmission rate is increased to P logarithmically due to residual interference, all the curves of fixed B is limited to infinite P. Also, it is observed that D-IA has throughput more advanced than that of the R-IA at the same feedback bit. In more detail, throughput of the D-IA at the B bit feedback is close to throughput of (B+2) bit feedback of the R-IA. This is approved using D-IA analysis numerical result in FIG. 4. As a result of comparison of the R-IA that uses sum transmission rate channel (B+1.5) bit codebook of the D-IA of B bit, the R-IA is an average value of sum transmission rates of bit codebook (B+1) and (B+2) bit random codebook. The simulation result depends on the analytic result in the Equation 13.

Figure 4:
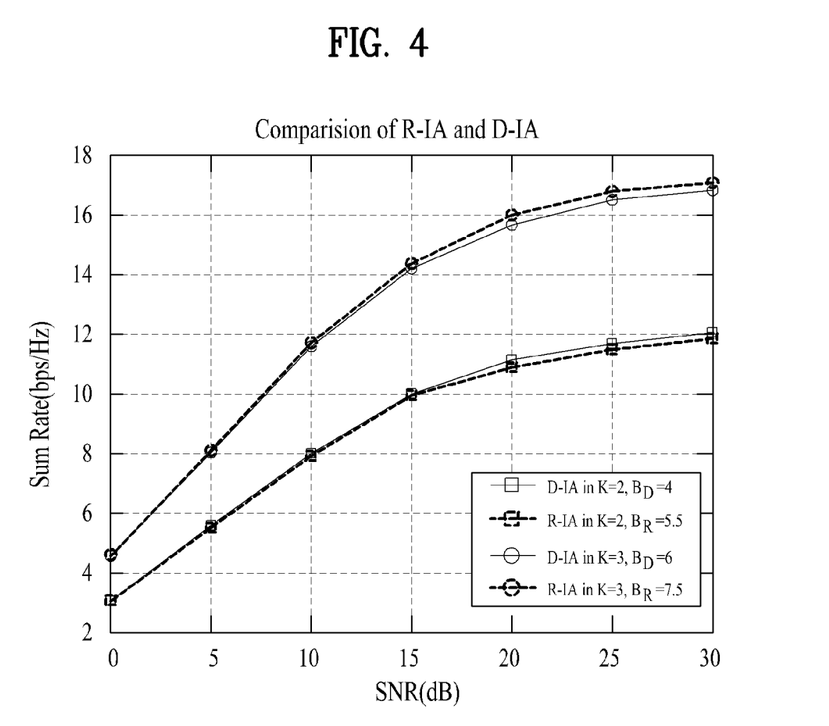
FIG. 4 is a diagram illustrating a sum transmission rate in D-IA and R-IA schemes in case of $B_R=(B_D+1.5)$ according to another embodiment of the present invention.

FIG. 4 is a diagram illustrating a sum transmission rate in D-IA and R-IA schemes in case of $B_R = (B_D + 1.5)$ according to another embodiment of the present invention.

Referring to FIG. 4, if bits used in D-IA and R-IA are 2, 4 and 6, the number K of users is 2 or 3, and $B_R = (B_D + 1.5)$, it is noted that a sum transmission rate based on SNR in the D-IA is almost the same as that of the R-IA in the same SNR.

In other words, if the other condition except for the number of bits is equally applied to the R-IA and the D-IA, the D-IA scheme may obtain the same effect while using the bit less than that of the R-IA scheme as much as 1.5 bit.

2. Iterative Directional-IA

Since IA maximizes sum throughput only in high SNR, the present invention suggests iterative directional-IA (D-IA) for enhancing system throughput in lower or middle SNR. The iterative D-IA algorithm which is suggested designs a direction of a transmission beamformer and receives a filter, which reflects an interference channel, as well as the suggested channel gain.

In the ZF-based D-IA algorithm, the beamformer $W_i$ and the receiver $U_i$ are designed to minimize residual interference only in each base station. However, the second suggestion of the present invention is the iterative directional IA algorithm and is intended to minimize ICI and at the same time maximize the power of the transmitted signal. In order to design $W_i$ and $U_i$, the following Equations 14 and 15 may be applied.

First of all, in order to ICI of the users of the jth cell, $U_i$ is calculated. $U_i$ is determined K eigenvector corresponding to $H_i^e$ which is the smallest eigenvalue of the interference channel to effectively reduce interference.

$$H_i^e = [H_i^{[i1]} w^{[i1]}, H_i^{[i2]} w^{[i2]}, \ldots, H_i^{[iK]} w^{[iK]}]:$$

$$U_i = U_i^e(:,2:M) \forall i, i \neq j \quad \text{[Equation 14]}$$

Referring to the Equation 14, $U_i^e$ is an eigenvector of $H_i^e$ $H_i^{e\dagger} = U_i^e \Sigma_i^e U_i^{e\dagger}$.

In the given $U_i$, the transmission beamformer $w^{[ik]}$ depends on Equation 15 to maximize the power of the transmitted signal.

$$w^{[ik]} = \text{max.eigenvector\_of } (H_i^{[ik]\dagger} U_i^\dagger U_i^\dagger H_i^{[ik]}), \forall i, k \quad \text{[Equation 15]}$$

In the second suggestion of the present invention, $W_i$ and $U_i$ are affected by each other in their calculation, whereby an iterative method for continuously updating and converging $W_i$ and $U_i$ will be suggested.

First of all, $W_i$ is reset. As a reset method of $W_i$, $w^{[ik]}$ which is a unit factor of $W_i$ is started as a vector which is randomly selected.

Next, $W_i$ and $U_i$ are updated.

The ith base station calculates $U_i$ by using the Equation 13, and calculates $W_i$ by using the Equation 15.

Afterwards, the ith base station transmits information of $W_i$ to the jth base station. Also, the jth base station transmits the information of $W_j$ to the ith base station.

The ith base station calculates $U_i$ by using the Equation 14 until $W_i$ and $U_i$ are converged, and continues to calculate $W_i$ by using the Equation 15.

The ith base station feeds $w^{[ik]}$ back to the kth user located at the ith cell through a feedback channel.

Then, the kth user transmits the received symbol $s^{[ik]}$ to the ith base station by using $w^{[ik]}$.

Figure 5:
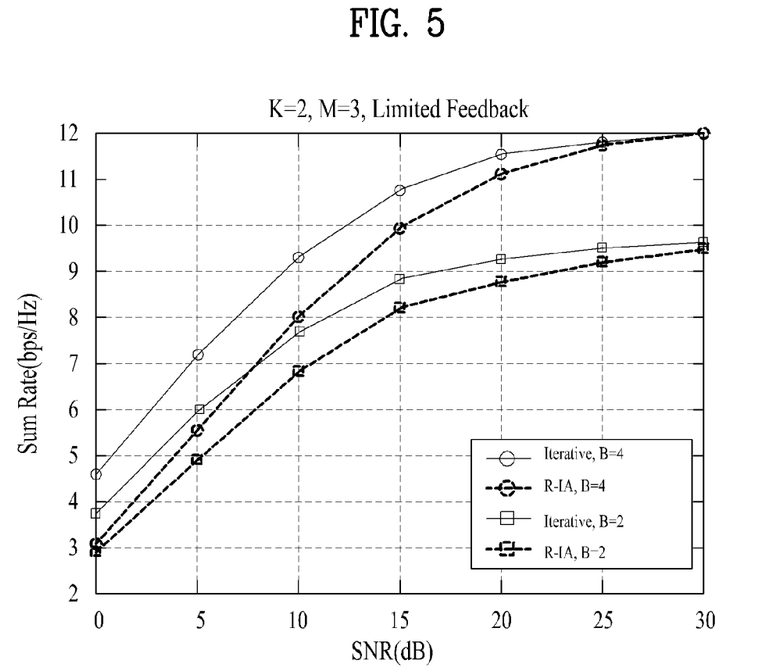
FIG. 5 is a diagram illustrating a sum transmission rate in D-IA and R-IA schemes in case of M=3 and K=2 according to still another embodiment of the present invention.

FIG. 5 is a diagram illustrating a sum transmission rate in D-IA and R-IA schemes in case of M=3 and K=2 according to still another embodiment of the present invention.

Referring to FIG. 5, if bits used in zero force D-IA algorithm and the iterative D-IA algorithm are 4 or 2, the number K of users is 2, and the number of antennas M is 3, it is noted that a sum transmission rate based on SNR in the D-IA is a little higher than that of the zero force D-IA.

3. Max. SNR Scheduling with D-IA

As the third method, the present invention uses a maximum SNR scheduler that selects a user, which is combined with a D-IA transceiver and has channel gain limited within a maximum range. Since the D-IA is used to minimize DCI, multi-user diversity gain may be obtained in a multi-cell environment.

The third method suggested in the present invention is D-IA based scheduling in the uplink MIMO system of two cells. Since the D-IA has been designed to minimize ICI of different base stations, in the present invention, multi-user diversity may be obtained from a serving base station by using the maximum SNR scheduler that selects K user having maximum channel gain. In this case, total users $K_T$ exist in each cell, and $K_s$ users are scheduled for data transmission, wherein $K_S \subset K_T, |K_S| = K$. At this time, the ith base station selects $K_{S_i}$ user set. $K_{S_i} = \arg\max_K \{\|H_i^{i1}\|^2\}$. In this case, $\arg\max_K$ is defined by index of the user K having maximum channel gain.

The third method is that the maximum SNR scheduler is applied to the first and second methods of the present invention.

The D-IA algorithm to which the maximum SNR scheduler applied to the first method is applied will be described as follows.

First of all, the ith base station schedules $K_{S_i}$. The ith base station measures the received channel, and schedules $K_{S_i}$ by using the maximum SNR scheduler. Then, the ith base station forwards $K_{S_i}$ index to the jth base station.

Afterwards, the jth base station calculates $W_i$. The jth base station calculates $v_i^*$ and $U_i$ in accordance with the Equation 9 by using $\{H_j^{[iK_{si}(1)]}, \ldots, H_j^{[iK_{si}(K)]}\}$. Also, the jth base station calculates $W^{[iK_{si}(k)]}, 1 \leq k \leq K$ by using the Equation 2.

Afterwards, the beamformers are exchanged between the base stations. The ith base station forwards $W_j$ to the jth base station through a backhaul link.

The ith base station feeds the beamformer back to its corresponding user, and transmits data to the corresponding user. The ith base station feeds $W^{[iK_{si}(k)]}$ back to the $K_{si}(k)$th user located at the ith cell through the feedback channel. Then, the $K_{si}(k)$th user transmits the received symbol $s^{iK_{si}(k)}$ to the ith base station by using the beamforming vector $W^{[iK_{si}(k)]}$.

Figure 6:
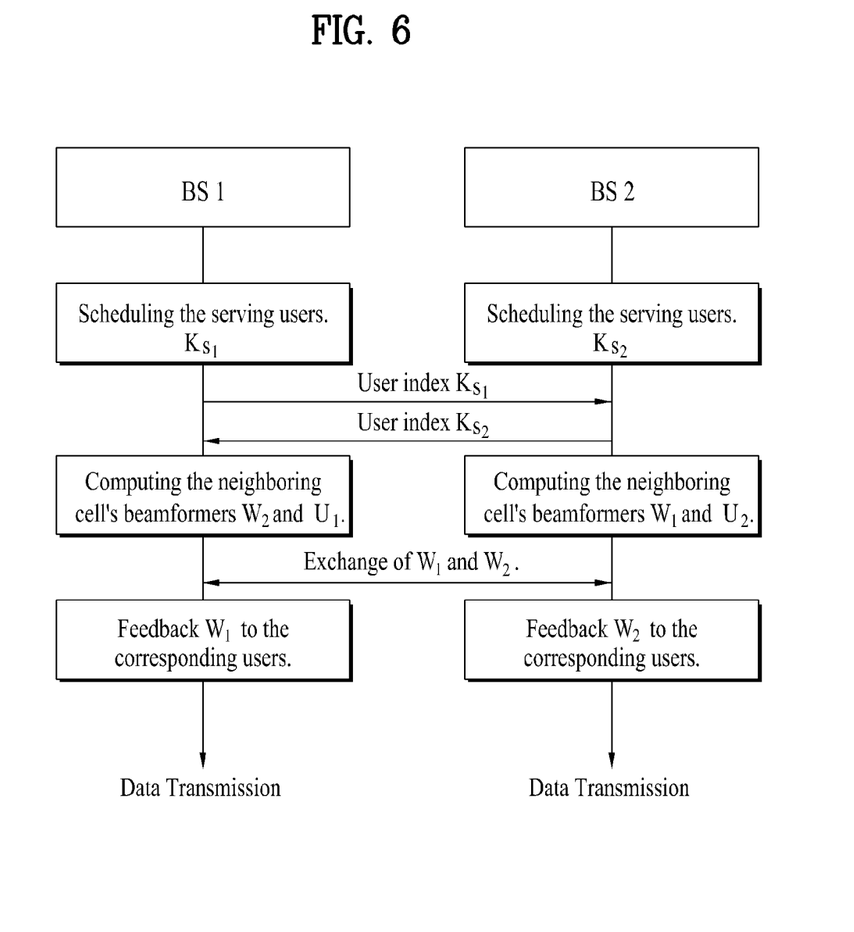
FIG. 6 is a diagram illustrating a flow chart of zero force directional-IA (D-IA) based on a maximum SNR scheduler according to still another embodiment of the present invention.

FIG. 6 is a diagram illustrating a flow chart of zero force directional-IA (D-IA) based on a maximum SNR scheduler according to still another embodiment of the present invention.

Referring to FIG. 6, the first base station schedules the $K_{S1}$th serving user, and the second base station schedules the $K_{S2}$th serving user. Then, the first base station and the second base station exchange user indexes $K_{S1}$ and $K_{S2}$ with each other.

The first base station calculates beamformers $W_2$ and $U_1$ of its neighboring cell, and the second base station calculates beamformers $W_1$ and $U_2$ of its neighboring cell. Then, the first base station and the second base station exchange $W_1$ and $W_2$ with each other.

The first base station feeds $W_1$ back to the user which belongs to the first base station, and the second base station feeds $W_2$ back to the user which belongs to the second base station. Each user transmits data by using $W_1$ and $W_2$.

The algorithm that the maximum SNR scheduler is applied to the iterative D-IA scheme which is the second method will be described as follows.

First of all, the ith base station measures $\{H_j^{[i1]}, \ldots, H_j^{[iK_T]}\}$ which is the received channel, and schedules $K_{S_i}$ by using the maximum SNR scheduler. Afterwards, the ith base station forwards $K_{S_i}$ index to the jth base station.

Second, $W_i$ and $U_i$ are updated.

The ith base station calculates $U_i$ by using $\{H_j^{[iK_{si}(1)]}, \ldots, H_j^{[iK_{si}(K)]}\}$ and the Equation 14. In this case, $W_i$ is calculated by the given $U_i$ by using the Equation 15.

Afterwards, the ith base station transmits information of $W_i$ to the jth base station. Also, the jth base station transmits the information of $W_j$ to the ith base station.

The ith base station calculates $U_i$ by using the Equation 14 until $W_i$ and $U_i$ are converged, and continues to calculate $W_i$ by using the Equation 15.

The ith base station feeds $W^{[iK_{si}(k)]}$ back to the $K_{s_i}(k)$th user located at the ith cell through a feedback channel.

Then, the $K_{s_i}(k)$th user transmits the received symbol $s^{iK_{si}(k)}$ to the ith base station by using a beamforming vector $W^{[iK_{si}(k)]}$.

Figure 7:
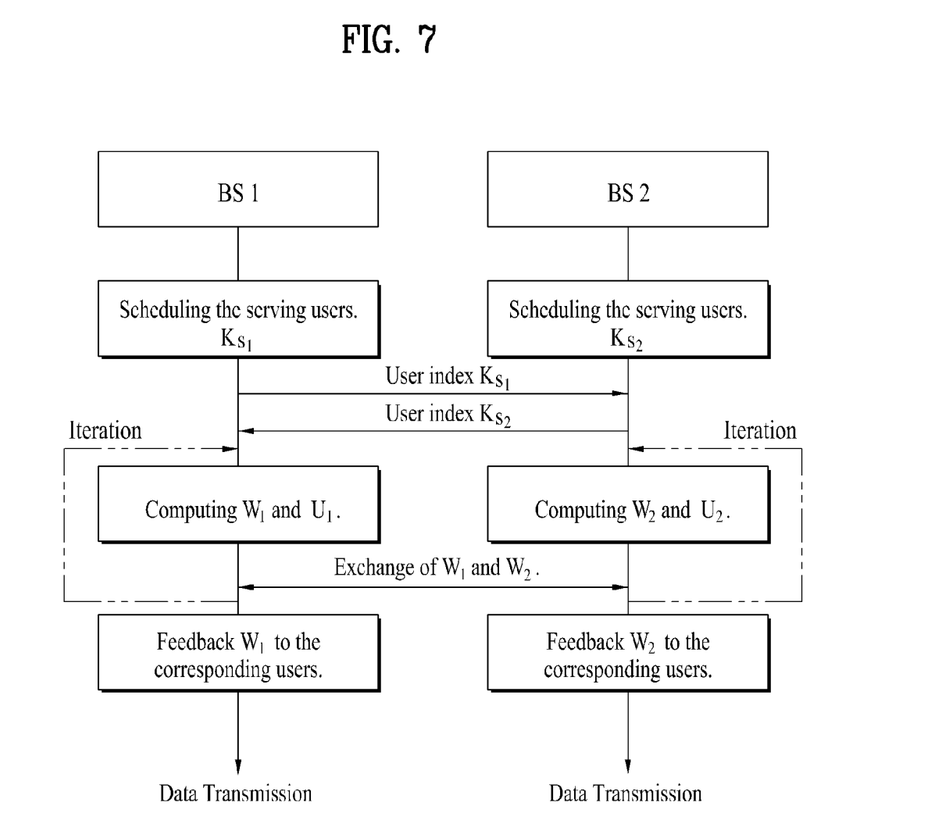
FIG. 7 is a diagram illustrating a flow chart of an iterative D-IA based on a maximum SNR scheduler according to still another embodiment of the present invention.

FIG. 7 is a diagram illustrating a flow chart of an iterative D-IA based on a maximum SNR scheduler according to still another embodiment of the present invention.

Referring to FIG. 7, the first base station schedules the $K_{S1}$th serving user, and the second base station schedules the $K_{S2}$th serving user. Then, the first base station and the second base station exchange user indexes $K_{S1}$ and $K_{S2}$ with each other.

The first base station calculates beamformers $W_2$ and $U_1$ of its neighboring cell, and the second base station calculates beamformers $W_1$ and $U_2$ of its neighboring cell. Then, the first base station and the second base station exchange $W_1$ and $W_2$ with each other. At this time, the first base station iteratively calculates the beamformers $W_2$ and $U_1$ of its neighboring cell and the second base station iteratively calculates beamformers $W_1$ and $U_2$ of its neighboring cell, until values of $W_1$, $U_1$ and $W_2$, $U_2$ are converged.

The first base station feeds $W_1$ back to the user which belongs to the first base station, and the second base station feeds $W_2$ back to the user which belongs to the second base station. Each user transmits data by using $W_1$ and $W_2$.

Figure 8:
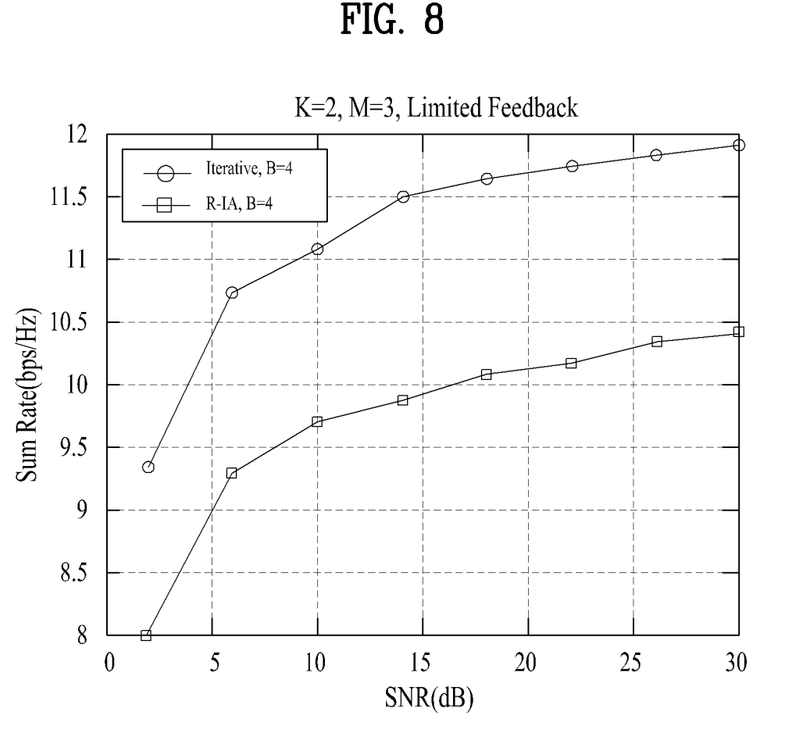
FIG. 8 is a diagram illustrating a flow chart of maximum zero force D-IA and iterative D-IA based on an SNR scheduler according to still another embodiment of the present invention.

FIG. 8 is a diagram illustrating a flow chart of maximum zero force D-IA and iterative D-IA based on an SNR scheduler according to still another embodiment of the present invention.

Referring to FIG. 8, if bits used in zero force D-IA algorithm and the iterative D-IA algorithm are 4, the number K of users is 2, and the number of antennas M is 3, it is noted that a sum transmission rate in D-IA is remarkably higher than that of the zero force D-IA in the same SNR.

Accordingly, in the present invention, as compared with the R-IA, the ZF_D-IA is the algorithm that a beamformer for removing an interference channel is selected and then transmitted to a neighboring base station.

However, as compared with the ZF_D-IA, the iterative D-IA is to select a beamformer by considering both interference channel nulling and the power of the transmitted signal. Also, it is noted that the iterative D-IA has a sum transmission rate higher than that of the ZF_D-IA.

Also, the iterative D-IA and the ZF_D-IA may be considered as methods in the MIMO system of two cells. For the operation in the MIMO system, the scheduler having maximum SNR may be used.

Accordingly, the beamformer is fed back to a set of a plurality of users, whereby each user may transmit a signal based on the beamformer. As a result, multi-user diversity may be increased using the IA transmitter combined with the scheduler in the multi-cell environment.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The base station and the method for reducing interference of a channel may industrially be used in various communication systems such as 3GPP LTE, LTE-A, and IEEE 802.

The invention claimed is:

1. A method for reducing interference at a base station in a wireless communication system, the method comprising:
   performing an interference alignment algorithm iteratively until a first beamforming vector and a second beamforming vector are satisfied with a predetermined condition;
   in response to the predetermined condition being satisfied, transmitting the second beamforming vector to a user equipment belonging to a serving cell; and
   measuring an interference channel based on interference from a user equipment belonging to a neighboring cell at a serving base station,
   wherein the performing the interference alignment algorithm iteratively comprises performing all of the following, one or more times, until the first beamforming vector and the second beamforming vector are satisfied with the predetermined condition:
      receiving a beamforming vector of the user equipment belonging to the neighboring cell from the neighboring cell;
      determining the first beamforming vector of the serving cell for minimizing an interference signal power based on the measured interference channel and the received beamforming vector;
      determining the second beamforming vector of a user equipment belonging to the serving base station for maximizing a desired signal power based on an uplink channel of the user equipment belonging to the serving base station and the first beamforming vector; and
      transmitting the second beamforming vector to a base station of the neighboring cell.

2. The method according to claim 1, wherein the second beamforming vector is transmitted to the base station of the neighboring cell through a backhaul link.

3. The method according to claim 1, wherein the first beamforming vector is determined based on a smallest eigenvalue of an effective interference channel corresponding to an interference channel reflecting the beamforming vector of the user equipment belonging to the neighboring cell, and the second beamforming vector is determined based on a largest eigenvalue of the uplink channel of the user equipment belonging to the serving base station reflecting the first beamforming vector.

4. The method according to claim 1, further comprising:
selecting a user equipment having maximum channel gain in accordance with a maximum signal to noise rate (SNR) scheduler, when there is a plurality of user equipments belonging to the serving cell; and
scheduling the interference channel by using an interference channel of the selected user equipment.

5. The method according to claim 1, further comprising:
selecting a user equipment having maximum channel gain in accordance with a maximum signal to noise rate (SNR) scheduler, when there is a plurality of user equipments belonging to the neighboring cell; and
scheduling the interference channel by using an interference channel of the selected user equipment.

6. The method according to claim 4, wherein a beamforming vector of the selected user equipment is calculated by the neighboring cell and then received.

7. A base station for reducing interference in a wireless communication system, the base station comprising:
a receiver;
a transmitter; and
a processor configured to control the receiver and the transmitter, and configured to:
perform an interference alignment algorithm iteratively until a first beamforming vector and a second beamforming vector are satisfied with a predetermined condition,
in response to the predetermined condition being satisfied, transmit the second beamforming vector to a user equipment belonging to a serving cell, and
measure an interference channel based on interference from a user equipment belonging to a neighboring cell,
wherein, to perform the interference alignment algorithm iteratively, the processor is further configured to perform all of the following, one or more times, until the first beamforming vector and the second beamforming vector are satisfied with the predetermined condition:

receive a beamforming vector of the user equipment belonging to the neighboring cell from the neighboring cell,
determine the first beamforming vector of the serving cell for minimizing interference signal power based on the measured interference channel and the received beamforming vector,
determine the second beamforming vector of a user equipment belonging to the serving base station for maximizing a desired signal power based on an uplink channel of a user equipment belonging to the serving base station and the first beamforming vector, and
control the transmitter to transmit the second beamforming vector to a base station of the neighboring cell.

8. The base station according to claim 7, wherein the second beamforming vector is transmitted to the base station of the neighboring cell through a backhaul link.

9. The base station according to claim 7, wherein the first beamforming vector is determined based on a smallest eigenvalue of an effective interference channel corresponding to an interference channel reflecting the beamforming vector of the user equipment belonging to the neighboring cell, and the second beamforming vector is determined based on a largest eigenvalue of the uplink channel of the user equipment belonging to the serving base station reflecting the first beamforming vector.

10. The base station according to claim 7, wherein, when there is a plurality of user equipments belonging to the serving cell, a user equipment having maximum channel gain is selected in accordance with a maximum signal to noise rate (SNR) scheduler, and the interference channel is scheduled by using an interference channel of the selected user equipment.

11. The base station according to claim 7, wherein, when there is a plurality of user equipments belonging to the neighboring cell, a user equipment having maximum channel gain is selected in accordance with a maximum signal to noise rate (SNR) scheduler, and the interference channel is scheduled by using an interference channel of the selected user equipment.

12. The base station according to claim 10, wherein a beamforming vector of the selected user equipment is calculated by the neighboring cell and then received.

* * * * *